US006385029B1

(12) United States Patent
Pennington

(10) Patent No.: US 6,385,029 B1
(45) Date of Patent: May 7, 2002

(54) TOTAL ELECTRICAL TRANSIENT ELIMINATOR

(75) Inventor: Donald G. Pennington, LaGrange, IL (US)

(73) Assignee: PVA Corporation, LaGrange, IL (US)

( * ) Notice: Subject to any disclaimer, the term of this patent is extended or adjusted under 35 U.S.C. 154(b) by 0 days.

(21) Appl. No.: 09/476,531

(22) Filed: Jan. 3, 2000

(51) Int. Cl.$^7$ ................................................. H02H 9/00

(52) U.S. Cl. ..................... 361/111; 361/56; 361/113; 361/118

(58) Field of Search ..................... 361/56, 111, 113, 361/115, 118, 119, 42

(56) References Cited

U.S. PATENT DOCUMENTS 5,619,080 A * 4/1997 Pennington et al. ........ 307/105

* cited by examiner

Primary Examiner—Stephen W. Jackson
(74) Attorney, Agent, or Firm—Davis Chin

(57) ABSTRACT

An apparatus and method for attenuating high frequency transients on AC power lines from damaging sensitive electrical and electronic circuits in an electrical load coupled to the AC power lines is provided. The AC power line has an earth ground and the electrical load has an electrical load ground. A continuous attenuator circuit is used for attenuating high frequency transients electrically coupled between the earth ground and the electrical load ground. The continuous attenuator circuit includes a plurality of toroid cores and a single continuous strand of wire being wound individually and sequentially a number of turns around each of the plurality of toroid cores.

17 Claims, 1 Drawing Sheet

TOTAL ELECTRICAL TRANSIENT ELIMINATOR

BACKGROUND OF THE INVENTION

1. Field of the invention

This invention relates generally to transient elimination or suppression systems and more particularly, it relates to an improved apparatus and method for attenuating high frequency transients in the range of 50 KHz to 200 MHz on AC power lines from damaging sensitive electrical and electronic circuits in equipment coupled to the AC power lines.

2. Description of the Prior Art

As is generally well-known in the art, modern electrical and electronic circuits in equipment, such as those that exist in microprocessors and computer systems, can be damaged or destroyed by voltage surges, transients, atmospheric discharges (i.e., lightning strikes), and other forms of undesirable electrical noise generated by motors, generators and the like which can cause interferences. As a consequence, there have been developed heretofore many types of transient suppression apparatuses for eliminating unwanted transient voltages or currents and for isolating such transients appearing on the AC external power lines so as to protect sensitive electrical and electronic circuits and equipment coupled to the external power lines.

A prior art search directed to the subject matter of this application in the U.S. Patent and Trademark Office revealed the following U.S. Letters Patent:

| | |
|---|---|
| 1,730,881 | 5,650,908 |
| 4,019,122 | 5,671,110 |
| 4,802,055 | 5,737,161 |
| 5,532,997 | |

In U.S. Pat. No. 5,532,897 to Carpenter, Jr. issued on Jul. 2, 1996, there is taught a high voltage substation level surge suppression system which includes a high energy surge arrestor and a low energy surge arrestor. A surge interceptor is interconnected between the two surge arrestors. The surge interceptor includes an inductor interconnected in parallel with a high energy resistor.

In U.S. Pat. No. 5,671,110 to McCartney et al. issued on Sep. 23, 1997, there is disclosed an apparatus for protecting a non-isolated data communication cable against ground skew used with an AC power source. A current summing transformer is coupled to the AC power source. The current summing transformer includes a single transformer core and a plurality of coils. One of the coils is connected with each phase, neutral and ground line in the AC power source. The current summing transformer provides a high impedance to surge current in the data cable ground of one or many non-isolated data cables.

In U.S. Pat. No. 5,737,161 to Thomas issued on Apr. 7, 1998, there is disclosed an overcurrent protection device which includes a relay having two coils wound on a common magnetic core and a PTC device coupled in parallel with the relay contacts. The first coil is a low impedance current coil, and the second coil is a high impedance voltage coil.

The remaining patents listed above but not specifically discussed are deemed to be of general interest and to show the state of the art pertaining to transient surge suppressors utilizing coils and cores.

Further, there is known in the prior art of U.S. Pat. No. 5,689,130 to Carlson issued on Nov. 18, 1997. This '180 patent teaches an isolated electrical power supply for protecting electrical devices from transient voltages and currents. A filter is provided which includes a toroid and a resistor which are used in conjunction with an isolator transformer. The filter is coupled between the secondary neutral lead of the transformer and the secondary ground lead so as to shunt the current or voltage spikes. A ferrite bead is connected between earth ground and a binding post for filtering current in the 70–200 KHz range.

However, none of the prior art discussed above teach an apparatus for attenuating high frequency transients on AC power lines like that of the present invention which includes a continuous attenuator circuit for attenuating high frequency transients in the frequency range of 50 KHz to 200 MHz electrically coupled between earth ground and an electrical load ground. The present invention represents significant improvement over the prior art discussed above.

SUMMARY OF THE INVENTION

Accordingly, it is a general object of the present invention to provide an improved apparatus for attenuating high frequency transients over a wider frequency range than has been traditionally available.

It is an object of the present invention to provide an improved method and apparatus for attenuating high frequency transients in the range of 50 KHz to 200 MHz on AC power lines from damaging sensitive electrical and electronic circuits and equipment coupled to the AC power lines.

It is another object of the present invention to provide an improved method and apparatus for attenuating high frequency transients which includes a continuous attenuator circuit formed of a plurality of toroid cores.

It is still another object of the present invention to provide any improved method and apparatus for attenuating high frequency transients which includes an isolation transformer and a continuous attenuator circuit.

It is yet still another object of the present invention to provide an improved apparatus and method for attenuating high frequency transients which includes a Ground Fault Circuit Interruptor and a continuous attenuator circuit.

In accordance with a preferred embodiment of the present invention there is provided an apparatus for attenuating high frequency transients on AC power lines from damaging sensitive electrical and electronic circuits in an electrical load coupled to the AC power line. The AC power line has an earth ground and the electrical load has an electrical load ground. An isolation transformer is provided which has a primary winding and a secondary winding. The primary winding has a primary source lead, a primary neutral lead, and a primary electrostatic shield lead. The secondary winding has a secondary source lead, a secondary neutral lead, and a secondary electrostatic shield lead. The primary source lead, primary neutral lead, and primary electrostatic shield lead are electrically coupled to the AC power lines.

The secondary source lead, secondary neutral lead, and secondary electrostatic shield lead are electrically coupled to the electrical load. The primary electrostatic shield lead and the secondary electrostatic shield lead are electrically connected together and to the earth ground. A continuous attenuator circuit is used to attenuate high frequency transients in the frequency range of 50 KHz to 200 MHz electrically coupled between the earth ground and the electrical load ground.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein.

DESCRIPTION OF THE PREFERRED EMBODIMENTS

Figure 1:
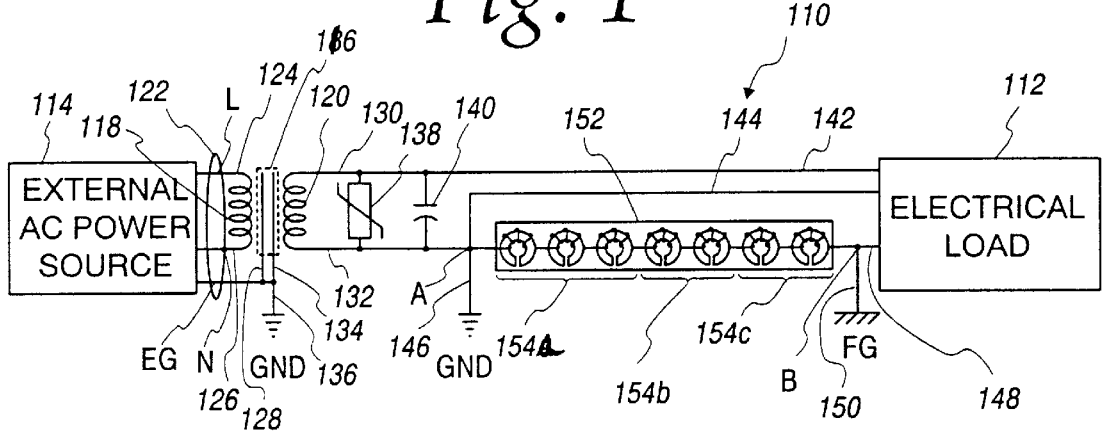
FIG. 1 is a schematic circuit diagram of an apparatus for attenuating high frequency transients, constructed in accordance with the principles of the present invention.

Referring now in detail to the drawings, there is shown in FIG. 1 a schematic circuit diagram of an improved apparatus 110 for attenuating high frequency transients, constructed in accordance with the principles of the present invention. The apparatus 110 is used to attenuate high frequency transients in the range of 50 KHz to 200 MHz and for isolating such transients from an electrical load 112 due to an external AC (alternating current) power source 114. The apparatus 110 includes an isolation transformer 116 having a primary winding 118 and a secondary winding 120. Typically, the primary-to-secondary winding ratio is 1:1.

The external AC power source 114 is connected to the primary winding 118 of the transformer 116 by a standard three-prong electrical plug 122. The isolation transformer 116 has a primary source lead 124 connected to the line lead L of the plug 122, a primary neutral lead 126 connected to the line lead N of the plug 122, and a primary electrostatic shield lead 128 connected to the line lead EG of the plug 122. The isolation transformer 116 also has a secondary source lead 130, a secondary neutral lead 132, and a secondary electrostatic shield lead 134. The primary electrostatic shield 128 and the secondary electrostatic shield 134 are connected together and to a line lead 136 which serves as a primary earth ground GND.

A metal oxide varistor (MOV) 138 has its ends connected across the secondary source lead 130 and the secondary neutral lead 132 of the isolation transformer 116. The metal oxide varistor 138 functions to clamp any high voltages which may be coupled through the secondary winding of the transformer to the electrical load 112. A filter capacitor 140 is connected in parallel with the MOV 138 and has its ends also connected across the secondary source lead 130 and the secondary neutral lead 132 of the isolation transformer 116. The purpose of the capacitor 140 is to attenuate high frequency voltage and current pulses in the 100 KHz frequency range.

Further, one end of the capacitor 140 is connected to a load source lead 142 of the electrical load 112, and its other end is connected to a load neutral lead 144 of the electrical load 112 at a node A. The node A is also connected to the primary earth ground GND via a lead line 146. An electrical load ground line 148 of the electrical load is connected to a node B which is joined to a floating ground FG via lead line 150.

In order to attenuate high frequency transient voltages and currents generated on the electrical load line 148 of the electrical load 112 from being passed straight back to the primary winding of the transformer, a continuous attenuator circuit 152 of the present invention is interconnected between the floating ground FG at the node B and the primary earth ground GND at the node A. Unlike the '180 patent of the prior art which has a filter circuit formed of a ferrite bead, resistor, and toroid for filtering current in the 70–200 KHz range, the instant continuous attenuator circuit 152 has been designed to filter high frequency transients in the range of 50 KHz to 200 MHz before they reach the secondary winding of the transformer.

Figure 3:
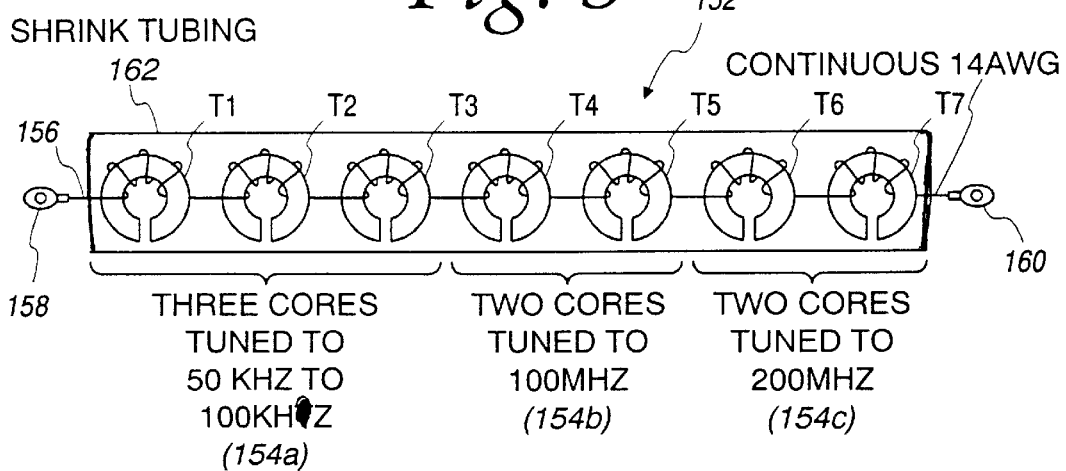
FIG. 3 is a detailed diagram of a continuous attenuator circuit formed of a plurality of toroid cores for use in the apparatus of FIG. 1 or FIG. 2.

With reference now to FIG. 3, there is shown a detailed diagram of the continuous attenuator circuit 152 which includes a plurality of sections 154a, 154b, and 154c. The first section 154a includes three series-connected toroids T1, T2 and T3 which are tuned to a frequency range between 50 KHz and 100 KHz. The second section 154b includes two series-connected toroids T4 and T5 which are tuned to a frequency of 100 MHz. The third section 154c includes two series-connected toroids T6 and T7 which are tuned to a frequency of 200 MHz.

Each of the toroids T1–T7 has a cylindrical core which is typically on the order of one to six inches in diameter. The diameter of each toroid is dependent upon the magnitude of the high frequency transients to be eliminated. While the core is shown to be cylindrical in shape, it should be apparent that other shapes may be also used. Further, the toroid may be of the split ring type. The toroid core is formed of a magnetic material such as iron and ferrite which is overwrapped with an epoxy. A single long continuous copper strand of wire 156 is wound individually and sequentially a number of turns around each core of the toroids T1–T7 which are disposed in close proximity to each other in either an end-to-end, side-by-side, or stacked fashion. In this manner, a "braided wire" effect is achieved by using the unbroken and continuous strand of wire 156.

As will be noted, one end of the copper wire 156 adjacent to the toroid Ti is connected to a lug 158 and the other end thereof adjacent to the toroid T7 is connected to a lug 160. A shrink tubing 162 may be placed over the toroids T1–T7 so as to package them into a single housing. In the preferred embodiment, the wire size as measured by the American Wire Gauge (AWG) is preferably a No. 12, 14 or 16 size and is most preferably a 16 AWG size. However, it should be clearly understood by those skilled in the art that different wire sizes, number of turns, and core sizes may be used to accommodate the various magnitude and frequencies of the transient voltages and currents. The total impedance of the continuous attenuator circuit 152 is in compliance with the National Electronic Code (NEC) and Underwriters Laboratories (UL) requirements of being safe for a ground conductor of an electrical product.

Figure 2:
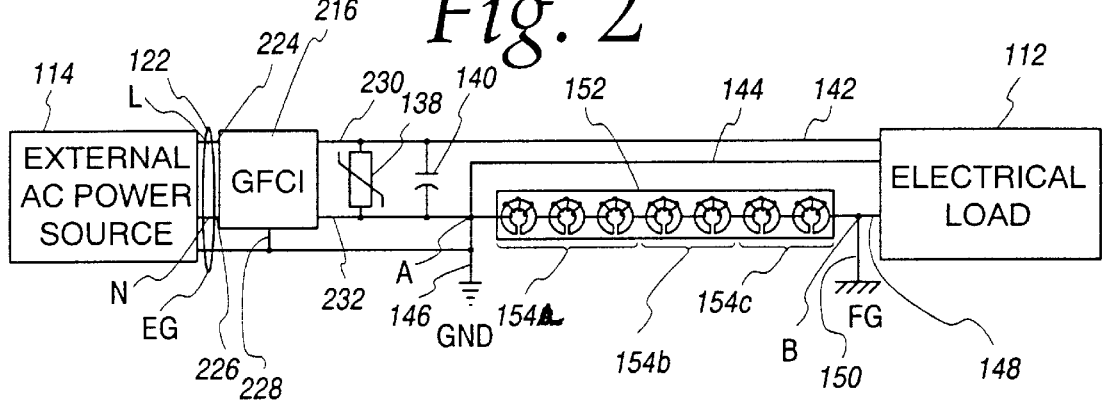
FIG. 2 is a schematic circuit diagram of a second embodiment of an apparatus for attenuating high frequency transients in accordance with the present invention.

In FIG. 2, there is illustrated a second embodiment of an apparatus 210 for attenuating high frequency transients in accordance with the present invention. The apparatus 210 is substantially identical in its construction to the apparatus 110 of FIG. 1, except that a Ground Fault Current Interruptor (GFCI) 216 has been used instead of the isolation transformer 116. The GFCI 216 has an input source lead 224 connected to the line lead L of the plug 122, an input neutral lead 226 connected to the line lead N of the plug, and a ground fault line 228 connected to the line lead EG of the plug. The GFCI 216 has also an output source lead 230 and an output neutral lead 232 which are coupled to the electrical load 114.

The GFCI 216 electrically couples the output source and neutral leads to the input source and neutral leads in a first mode of operation and electrically isolates the output source and neutral leads from the input source and neutral leads in a second mode of operation. Except for these differences, the apparatus 210 for attenuating high frequency transients operates and functions in the same manner as just previously described with respect to FIG. 1. Thus, a detailed description of the interconnection of the components and their operation will not be repeated.

From the foregoing detailed description, it can thus be seen that the present invention provides an improved method and apparatus for attenuating high frequency transients on AC power lines from damaging sensitive electrical and electronic circuits in an electrical load coupled to the AC power line. The AC power line has an earth ground and the electrical load has an electrical load ground. A continuous attenuator circuit for attenuating high frequency transients in the frequency range of 50 KHz to 200 MHz is electrically coupled between the earth ground and the electrical load ground.

While there has been illustrated and described what are at present considered to be preferred embodiments of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiments disclosed as the best modes contemplated for carrying out the invention, but that the invention will include all embodiments falling within the scope of the appended claims.

What is claimed is:

1. An apparatus for attenuating high frequency transients on AC power lines from damaging sensitive electrical and electronic circuits in an electrical load coupled to the AC power lines, said AC power lines having an earth ground and said electrical load having an electrical load ground, said apparatus comprising:

an isolation transformer having a primary winding and a secondary winding, said primary winding having a primary source lead, a primary neutral lead, and a primary electrostatic shield lead, said secondary winding having a secondary source lead, a secondary neutral lead, and a secondary electrostatic shield lead;

said primary source lead, primary neutral lead and primary electrostatic shield lead being electrically coupled to the AC power lines;

said secondary source lead, secondary neutral lead and secondary electrostatic shield lead being electrically coupled to the electrical load;

said primary electrostatic shield lead and said secondary electrostatic shield lead being electrically connected together and to the earth ground;

continuous attenuator means for attenuating high frequency transients electrically coupled between the earth ground and the electrical load ground; and said continuous attenuator means being formed of a plurality of toroid cores and a single continuous strand of wire being wound individually and sequentially a number of turns around each of said plurality of toroid cores, said strand of wire having a first end connected to the earth ground and a second end connected to the electrical load ground.

2. An apparatus as claimed in claim 1, wherein a first three of said plurality of toroid cores are tuned to a frequency range between 50 KHz and 100 KHz, a second two of said plurality of toroid cores are tuned to a frequency of 100 MHz, and a third two of said plurality of toroid cores are tuned to a frequency of 200 MHz.

3. An apparatus as claimed in claim 2, further comprising high voltage clamping means coupled between said secondary source lead and said secondary neutral lead of said isolation transformer for clamping a voltage therebetween to a predetermined level.

4. An apparatus as claimed in claim 3, wherein said clamping means is a metal oxide varistor.

5. An apparatus as claimed in claim 4, further comprising filter capacitor means also coupled between said secondary source lead and said secondary neutral lead of said isolation transformer for attenuating high frequency voltage and current pulses.

6. An apparatus for attenuating high frequency transients on AC power lines from damaging sensitive electrical and electronic circuits in an electrical load coupled to the AC power lines, said AC power lines having an earth ground and said electrical load having an electrical load ground, said apparatus comprising:

ground fault current interrupter means having input leads and output leads for electrically coupling said output leads to said input leads in a first mode of operation and for electrically isolating said output leads from said input leads in a second mode of operation;

said input leads being electrically coupled to the AC power lines;

said output leads being electrically coupled to the electrical load;

said ground fault current interrupter being electrically connected to the earth ground;

continuous attenuator means for attenuating high frequency transients electrically coupled between the earth ground and the electrical load ground; and said continuous attenuator means being formed of a plurality of toroid cores and a single continuous strand of wire being wound individually and sequentially a number of turns around each of said plurality of toroid cores, said strand of wire having a first end connected to the earth ground and a second end connected to the electrical load ground.

7. An apparatus as claimed in claim 6, wherein a first three of said plurality of toroid cores are tuned to a frequency range between 50 KHz and 100 KHz, a second two of said plurality of toroid cores are tuned to a frequency of 100 MHz, and a third two of said plurality of toroid cores are tuned to a frequency of 200 MHz.

8. An apparatus as claimed in claim 7, further comprising high voltage clamping means coupled between said secondary source lead and said secondary neutral lead of said isolation transformer for clamping a voltage therebetween to a predetermined level.

9. An apparatus as claimed in claim 8, wherein said clamping means is a metal oxide varistor.

10. An apparatus as claimed in claim 9, further comprising filter capacitor means also coupled between said secondary source lead and said secondary neutral lead of said isolation transformer for attenuating high frequency voltage and current pulses.

11. A method for attenuating high frequency transients on AC power lines from damaging sensitive electrical and electronic circuits in an electrical load coupled to the AC power lines, said AC power lines having an earth ground and said electrical load having an electrical load ground, said method comprising the steps of:

coupling electrically input leads of an isolation device to the AC power source;

coupling electrically output leads of the isolation device to the electrical load;

coupling electrically the isolation device to the earth ground;

attenuating high frequency transients in a continuous attenuator circuit electrically coupled between the earth ground and the electrical load ground; and said continuous attenuator circuit including of a plurality of toroid cores and a single continuous strand of wire being wound individually and sequentially a number of turns around each of said plurality of toroid cores, said strand of wire having a first end connected to the earth ground and a second end connected to the electrical load ground.

12. A method as claimed in claim 11, wherein a first three of said plurality of toroid cores are tuned to a frequency range between 50 KHz and 100 KHz, a second two of said plurality of toroid cores are tuned to a frequency of 100 MHz, and a third two of said plurality of toroid cores are tuned to a frequency of 200 MHz.

13. A method as claimed in claim 12, further comprising high voltage clamping means coupled between said secondary source lead and said secondary neutral lead of said isolation transformer for clamping a voltage therebetween to a predetermined level.

14. A method as claimed in claim 13, wherein said clamping means is a metal oxide varistor.

15. A method as claimed in claim 14, further comprising filter capacitor means also coupled between said secondary source lead and said secondary neutral lead of said isolation transformer for attenuating high frequency voltage and current pulses.

16. A method as claimed in claim 11, wherein said isolation device is an isolation transformer.

17. A method as claimed in claim 11, wherein said isolation device is a ground fault current interrupter.

* * * * *